US012617685B2

(12) United States Patent (10) Patent No.: US 12,617,685 B2
Olbert et al. (45) Date of Patent: May 5, 2026

(54) PROCESS, REACTION MIXTURE AND CATALYST FOR THE PRODUCTION OF PHOSGENE

(71) Applicant: BASF SE, Ludwigshafen am Rhein (DE)

(72) Inventors: Gerhard Olbert, Ludwigshafen am Rhein (DE); Benjamin Kron, Seattle, WA (US); Jochen Gauer, Ludwigshafen am Rhein (DE); Jens Ferbitz, Ludwigshafen am Rhein (DE); Torsten Mattke, Ludwigshafen am Rhein (DE); Kai Thiele, Antwerp (BE); Peter Van Den Abeel, Antwerp (BE); Koenraad Vandewalle, Antwerp (BE); Kirill Bramnik, Ludwigshafen am Rhein (DE); Jim Brandts, De Meern (NL)

(73) Assignee: BASF SE, Ludwigshafen am Rhein (DE)

( * ) Notice: Subject to any disclaimer, the term of this patent is extended or adjusted under 35 U.S.C. 154(b) by 608 days.

(21) Appl. No.: 17/925,331

(22) PCT Filed: May 10, 2021

(86) PCT No.: PCT/EP2021/062268

§ 371 (c)(1),
(2) Date: Nov. 15, 2022

(87) PCT Pub. No.: WO2021/233708

PCT Pub. Date: Nov. 25, 2021

(65) Prior Publication Data

US 2023/0192500 A1 Jun. 22, 2023

(30) Foreign Application Priority Data

May 20, 2020 (EP) ..................................... 20175603
Apr. 21, 2021 (EP) ..................................... 21169639

(51) Int. Cl.
*C01B 32/80* (2017.01)
*B01J 21/18* (2006.01)
*B01J 35/61* (2024.01)
*B01J 35/63* (2024.01)
*B01J 35/64* (2024.01)

(52) U.S. Cl.
CPC .............. *C01B 32/80* (2017.08); *B01J 21/18* (2013.01); *B01J 35/617* (2024.01); *B01J 35/618* (2024.01); *B01J 35/635* (2024.01); *B01J 35/638* (2024.01); *B01J 35/647* (2024.01)

(58) Field of Classification Search
None
See application file for complete search history.

(56) References Cited

U.S. PATENT DOCUMENTS

| | | | |
|---|---|---|---|
| 6,054,612 | A | 4/2000 | Cicha et al. |
| 2004/0011288 | A1 | 1/2004 | Affinito |

FOREIGN PATENT DOCUMENTS

| | | | |
|---|---|---|---|
| DE | 102008025850 A1 | 12/2009 | |
| EP | 0952961 A1 | 11/1999 | |
| JP | 2000264617 A | * 9/2000 | |
| WO | 03/72237 A1 | 9/2003 | |
| WO | 2003/072273 A1 | 9/2003 | |
| WO | 2009/143971 A1 | 12/2009 | |
| WO | 2010/076208 A1 | 7/2010 | |
| WO | 2012/092210 A1 | 7/2012 | |
| WO | 2019/147836 A2 | 8/2019 | |

OTHER PUBLICATIONS

English language translation of Akiyoshi (JP2000264617A, published on Sep. 26, 2000), obtained May 23, 2025 (Year: 2025).*
English language translation of the Office action for corresponding CN application 202180036113.5, issued by the State Intellectual Property Office of People's Republic of China on Dec. 27, 2024 (Year: 2024).*
Translation of JP2000264617A, published on Sep. 26, 2000, obtained Aug. 2025 (Year: 2025).*
Murray ("Use of Mercury Intrusion Data, Combined with Nitrogen Adsorption Measurements, as a Probe of Pore Network Connectivity" Langmuir, 1999, p. 8155) (Year: 1999).*
Christopher, et al., "Selection of carbon catalysts for the industrial manufacture of phosgene", Catal. Sci. Technol, vol. 2, 2012, pp. 2109-2115.
International Search Report and Written Opinion received for PCT Patent Application No. PCT/EP2021/062268, mailed on Aug. 2, 2021, 11 pages.
European Search Report for EP Patent Application No. 20175603.8, Issued on Sep. 21, 2020, 3 pages.

(Continued)

*Primary Examiner* — Amy C Bonaparte
(74) *Attorney, Agent, or Firm* — Faegre Drinker Biddle & Reath LLP

(57) ABSTRACT

The invention relates to a process for the production of phosgene comprising a gas phase reaction of carbon monoxide and chlorine in the presence of a carbon catalyst in a multi-tubular reactor, wherein the carbon catalyst comprises an amount of mesopores having a pore diameter in the range of from 2 to 50 nm of at least 0.45 ml/g of the total pore volume and the use of a carbon catalyst comprising an amount of mesopores having a pore diameter in the range of from 2 to 50 nm of at least 0.45 ml/g of the total pore volume, for the production of phosgene and a reaction mixture for preparing phosgene, the mixture comprising a catalyst for preparing phosgene comprising a porous material comprising carbon, micropores and mesopores, wherein said micropores have a pore diameter of less than 2 nm and wherein said mesopores have a pore diameter in the range of from 2 to 50 nm, wherein the volume of the mesopores of the porous material is of at least 0.45 ml/g, and a gas stream G comprising carbon monoxide (CO) and chlorine (Cl$_2$).

17 Claims, No Drawings

(56)               References Cited

OTHER PUBLICATIONS

European Search Report for EP Patent Application No. 21169639.8, Issued on Oct. 4, 2021, 3 pages.
Khachatryan, et al., "Formation of chlorinated hydrocarbons from the reaction of chlorine atoms and activated carbon", Chemosphere, vol. 52, issue 4, Jul. 2003, pp. 709-716.
Schneider, et al., "Chapter: 1.2.2 Reactions with Inorganic Compounds", Phosgene, vol. A 19, 5th Edition, Ullmann's Encyclopedia of industrial chemistry, 1991, pp. 413-420.

* cited by examiner

PROCESS, REACTION MIXTURE AND CATALYST FOR THE PRODUCTION OF PHOSGENE

CROSS-REFERENCE TO RELATED APPLICATIONS

This application is a national stage application (under 35 U.S.C. § 371) of PCT/EP2021/062268, filed May 10, 2021, which claims benefit of European Application Nos. 20175603.8, filed May 20, 2020, and 21169639.8, filed Apr. 21, 2021, all of which are incorporated herein by reference in their entirety.

The invention relates to a process for the production of phosgene by gas phase reaction of carbon monoxide and chlorine in the presence of a catalyst, in particular in the presence of a specifically designed carbon catalyst and a reaction mixture for preparing phosgene comprising a catalyst, a catalyst for preparing phosgene comprising a porous material, and to the use of said mixture and a catalyst for preparing phosgene. Further, the present invention relates to a process for preparing said catalyst.

Phosgene is an important excipient in the production of intermediate and end products in almost all branches of chemistry. In particular phosgene represents a widely used reagent for industrial carbonylation, for example in the production of isocyanates or organic acid chlorides. The largest field of use in terms of volume is the production of diisocyanates for polyurethane chemistry, in particular toluene diisocyanate or 4,4-diisocyanate diphenylmethane.

Phosgene is produced in large-scale in a catalytic gas phase reaction of carbon monoxide and chlorine in the presence of a catalyst, for example, an activated carbon catalyst, according to the reaction equation:

$$CO + Cl_2 \leftrightarrows COCl_2$$

The reaction is strongly exothermic with a reaction enthalpy $\Delta H$ of $-107.6$ kJ/mol. To remove the reaction heat the reaction is normally carried out in tube-bundle reactors with catalyst filled inside the tubes (see Ullmann's Encyclopedia of industrial chemistry, Chapter "Phosgene" 5th Ed. Vol. A 19, p 413 ff., VCH Verlagsgesellschaft mbH, Weinheim, 1991). Generally, granular catalyst with a grain size in the range of from 3 to 5 mm is used in pipes with a typical inner diameter between 35 and 70 mm, typically between 39 and 45 mm. The reaction starts at temperatures of 40 to 50° C., but the temperature within the pipes increases up to 400° C. or even higher. In the reaction, carbon monoxide is usually used in excess to ensure that all chlorine is converted, and largely chlorine-free phosgene is produced, since chlorine can lead to undesirable side reactions in the subsequent use of phosgene. The reaction can be carried out without pressure but is usually carried out at an overpressure of 200-600 kPa (2-6 bar). In this pressure range, the formed phosgene can be condensed after the reactor with cooling water or other heat carrier, for example organic heat carrier can be used, so that the condenser can be operated more economically.

Heat management within the reactor is one of the main challenges in phosgene production necessary for performing a safe and economic process. In general, different methods are available to handle the reaction heat. The main influence on the heat management are a specific reactor design and catalyst selection or design, allowing for a fast removal of the resulting reaction heat by reducing heat and mass transport limitations.

In the prior art a broad variety of reactor designs is described. Generally, the contact tubes of the tube bundle reactor are rinsed by a heat carrier, which dissipates the resulting reaction heat from the reactor. It has been shown that a transverse flow of the contact tubes improves the heat dissipation. To achieve this, usually deflection plates are installed in the reactor, which allow by a meander-shaped flow of the heat carrier a transverse flow to the contact tubes of the heat carrier.

For example, a typical large-scale reactor for the production of phosgene is described in the international patent application WO 03/072237 A1.

The throughput of the reactor can be specified by the so-called surface load or phosgene load of the reactor, which is defined as the amount of converted phosgene per unit of time (usually expressed in kg/s), based on the cross-sectional area of the catalyst, i.e. the sum of the inner cross-sectional surfaces of the catalytic contact tubes (usually specified in $m^2$). In order to control the reaction heat, therefore, surface loads between 0.5 and 2 kg of phosgene/$m^2$s are usually applied in the prior art. The phosgene surface load is thus essentially determined on the assumption of a complete conversion of the component, which is not in excess, i.e. in the case of excess carbon monoxide by the chlorine feed.

The term "reactor" in the present application covers all parts of a plant in which the chemical conversion of carbon monoxide and chlorine gas to phosgene takes place. Often, a reactor in this sense is a single component defined by a reactor vessel. However, a reactor within the meaning of the present application may also comprise two or more components with separate reactor tanks, which are arranged, for example, one after the other (serially). In this case, the surface load refers to the total turnover, i.e. the phosgene flow, which leaves the last reactor component, e.g. the last reactor vessel.

In the international patent application WO 2010/076208 A1, an optimized arrangement of the contact tubes is disclosed resulting in heat transfer coefficients at the boundary layer between the contact tubes and the heat carrier to be balanced over the reactor cross-section. This could be achieved by aligning the flow paths of the heat carrier in each reactor cross-section. In such a reactor with optimized heat transfer flow profile, surface loads of up to 2.74 kg phosgene/$m^2$s could be achieved.

Beside the reactor the catalyst has a large influence on the efficiency of the respective phosgene production process.

As described in the publication of Mitchell et al. "Selection of carbon catalyst for the industrial manufacture of phosgene", Catal. Sci. Technol., 2012, vol. 2, p. 2109-2115, during the synthesis of phosgene a deactivation or burn-off of the catalyst can be seen, so that after appropriate operating time a shutdown of the plant and a renewal of the catalyst is required. This can be caused on the one hand by an oxidation of carbon by traces of oxygen in the supplied chlorine gas. On the other hand, at higher temperatures, typically above 300° C., there may also be a reaction of chlorine with the activated carbon of the catalyst leading to the formation of volatile tetrachlorocarbon ($CCl_4$). Mitchell et al. evaluated 7 commercially available carbon catalysts which are recommended by different suppliers for the manufacture of phosgene. Low activity of a catalyst was attributed to the mesoporous nature of a catalyst.

As may also be taken from Christopher J. Mitchell et al., Selection of carbon catalysts for the industrial manufacture of phosgene, Hunstman Polyurethanes, Catal. Sci. Technol., 2012, 2109-2115., it is well-known that carbon catalysts are used for preparing phosgene. In particular, in said publication, different carbon catalysts (porous materials) are tested. Two commercially available catalysts, namely Chemviron Solcarb 208C DM and Donau Supersorbon K40 exhibit the best catalytic activity. There is however still a need to provide improved catalyst for pre-paring phosgene.

Usually activated carbons derived from natural sources like coconut-shell, wood, olive cores are used as catalyst. The porous structure of such activated carbons contains especially micropores (<2 nm) and macropores (>50 nm). The main reaction takes place in the micropores representing a high surface area while the macropores are responsible for the transport of raw material inside and the product outside the catalyst particle.

The activity of the catalyst depends on a suitable ratio of transport and reaction pores and hence of macro pores to micropores.

EP 0952961 discloses a process for the manufacture of phosgene by the reaction of chlorine with carbon monoxide in the presence of a carbon catalyst. More particularly, it relates to a process for the manufacture of phosgene with minimal production of the hazardous chemical, carbon tetrachloride. In this patent a volume ratio of micropores to macropores below 3.5 and preferred below 2.0 to minimize mass transfer limitations is claimed.

However, even with this measure a transport limitation remains. This limitation leads to low activity of the catalyst and long residence time of the components at high temperature inside the particles and causing a deactivation of the catalyst e.g. by formation of chlorinated hydrocarbons from carbon and chlorine (see Khachatryan and Dellinger "Formation of chlorinated hydrocarbons from the reaction of chlorine atoms and activated carbon", Chemosphere 52 (2003), S. 709-716).

Low activity demands for higher catalyst amount and bigger reactors. Catalyst deactivation causes shut-downs of the production plants for catalyst exchange and hence loss of production. Uncomplete chlorine conversion due to deactivated catalyst can cause quality issues in the downstream usage of phosgene.

The aim of this application is to overcome the disadvantages of the prior art.

The technical problem underlying the present invention is to provide a process and catalyst for the production of phosgene, showing an increased catalyst activity and reduced catalyst deactivation, resulting in a longer catalyst lifetime and a reduced formation of undesired side products as for example carbon tetrachloride in the phosgene synthesis.

The invention therefore relates to a process for the production of phosgene comprising a gas phase reaction of carbon monoxide and chlorine in the presence of a carbon catalyst in a multitubular reactor, wherein the carbon catalyst comprises an amount of mesopores having a pore diameter in the range of from 2 to 50 nm of at least 0.45 ml/g of the total pore volume.

Additionally, it was an object of the present invention to provide a new reaction mixture for producing phosgene. In particular, it was necessary to provide a new reaction mixture comprising a catalyst for the production of phosgene which presents a higher catalytic activity and longer catalytic lifetime compared to those commercially available and reduces the formation of CCl4 during phosgene preparation.

Therefore, the present invention relates also to a reaction mixture for preparing phosgene, the mixture comprising (i) a catalyst for preparing phosgene comprising
a porous material comprising carbon, micropores and mesopores, wherein said micropores have a pore diameter of less than 2 nm and wherein said mesopores have a pore diameter in the range of from 2 to 50 nm, wherein the volume of the mesopores of the porous material is of at least 0.45 ml/g; and
(ii) a gas stream G comprising carbon monoxide (CO) and chlorine (Cl$_2$).

As used herein, and unless the context dictates otherwise, the following terms have the meanings as specified below.

"Carbon material" refers to a material or substance comprised substantially of carbon. Carbon materials include ultrapure as well as amorphous and crystalline carbon materials. Examples of carbon materials include, but are not limited to, activated carbon, pyrolyzed dried carbon, pyrolyzed polymer compositions and the like.

"TXRF impurity" or "TXRF element" may be any impurity element having an atomic number ranging from 11 to 92 (i.e., from beryllium to uranium). The phrases "total TXRF impurity content" and "total TXRF impurity level" both refer to the sum of all TXFR impurities present in a sample, for example, a polymer composition, a cured polymer composition, or a carbon material. TXRF impurity concentrations and identities may be determined by total reflection x-ray fluorescence (TXRF).

"Activate" and "activation" each refer to the process of heating a raw material or carbonized/pyrolyzed substance at an activation dwell temperature during exposure to oxidizing atmospheres (e.g., carbon dioxide, oxygen, steam or combinations thereof) to produce an "activated" substance (e.g., activated cryogel or activated carbon material). The activation process generally results in a stripping away of the surface of the particles, resulting in an increased surface area. Alternatively, activation can be accomplished by chemical means, for example, by impregnation of carbon-containing precursor materials with chemicals such as acids like phosphoric acid or bases like potassium hydroxide, sodium hydroxide or salts like zinc chloride, followed by carbonization. "Activated" refers to a material or substance, for example a carbon material, which has undergone the process of activation.

"Impurity" or "impurity element" refers to an undesired foreign substance (e.g., a chemical element) within a material which differs from the chemical composition of the base material. For example, an impurity in a carbon material refers to any element or combination of elements, other than carbon, which is present in the carbon material. Impurity levels are typically expressed in parts per million (ppm).

"Ultrapure" refers to a substance having a total TXRF impurity content of less than 0.050%. For example, an "ultrapure carbon material" is a carbon material having a total TXRF impurity content of less than 0.050% (i.e., 500 ppm).

"Ash content" refers to the nonvolatile inorganic matter which remains after subjecting a substance to a high decomposition temperature. Herein, the ash content of a carbon material is calculated from the total TXRF impurity content as measured by total reflection x-ray fluorescence, assuming that nonvolatile elements are completely converted to expected combustion products (i.e., oxides).

"Pore" refers to an opening or depression in the surface, or a tunnel in a carbon material, such as for example pyrolyzed carbon material, pyrolyzed polymer compositions, activated carbon material, activated polymer compositions and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, mesopore volume, surface area, density, pore size distribution and pore length. Generally the pore structure of an activated carbon material comprises micropores and mesopores. For example, in certain embodiments the ratio of micropores to mesopores is optimized for enhanced catalytic performance.

"Mesopore" generally refers to a pore having a diameter ranging from 2 nanometers to 50 nanometers while the term "micropore" refers to a pore having a diameter less than 2 nanometers. "Macropore" refers to a pore having a diameter above 50 nanometers.

"Surface area" refers to the total specific surface area of a substance measurable by the BET technique. Surface area is typically expressed in units of m²/g. The BET (Brunauer/Emmett/Teller) technique employs an inert gas, for example nitrogen, to measure the amount of gas adsorbed on a material and is commonly used in the art to determine the accessible surface area of materials.

"Total pore volume" refers to the total pore volume measurable by nitrogen adsorption technique. The Total pore volume is typically expressed in units of cm3/g.

"NLDFT Surface area" refers to the total specific surface area of a substance measurable by dual-isotherm NLDFT Advanced Pore Size Distribution (Micromeritics Instrument Corp., Norcross, GA, USA). NLDFT Surface area is typically expressed in units of m2/g. The NLDFT Advanced Pore Size Distribution technique employs up to two inert gases. For example, nitrogen and carbon dioxide, to measure the amount of gas adsorbed on a material and can be used to determine the accessible surface area of materials.

"NLDFT Pore Volume" refers to the total specific pore volume of a substance measurable by dual-isotherm NLDFT Advanced Pore Size Distribution (Micromeritics Instrument Corp., Norcross, GA, USA). NLDFT Pore Volume is typically expressed in units of cm3/g. The NLDFT Advanced Pore Size Distribution technique employs up to two inert gases. For example nitrogen and carbon dioxide, to measure the amount of gas adsorbed on a material and can be used to determine the total pore volume of materials.

Surprisingly it could be found that a carbon catalyst with a high amount of mesopores in the range from 2 to 50 nm of at least 0.45 ml/g of the total pore volume leads to higher conversion in the phosgene reaction section equivalent to a higher activity, a slower deactivation resulting in a longer catalyst life time/plant life time, the yield of the process with respect to the chlorine used can be increased, an excellent heat transfer and a reduced formation of carbon tetrachloride.

Without being bound by this theory it is believed that due to the high amount of mesopores a minimization of mass transport limitations inside the catalyst particles occurs, resulting in a decreased loss of micropores, in which the main reaction takes place on a high surface area, and thus a higher catalyst activity over time, detected as a decreased deactivation rate.

The carbon material with high mesopore content can be prepared either by modification of activated carbons based on natural products or by producing synthetic carbons e.g. by pyrolysis and activation of carbon aerogels. Some of the carbon materials can be seen as monolithic carbon.

The carbon materials useful as catalysts for this invention comprise a pore structure, the pore structure comprising micropores, mesopores and a total pore volume, which is typically described in terms of fraction (percent) of total pore volume residing in either micropores or mesopores or both, wherein at least 50% of the total pore volume resides in mesopores, at most 50% of the total pore volume resides in micropores and less than 40% of the total pore volume resides in pores greater than 20 nm.

The optimized blend of micropores and mesopores within the carbon materials contributes to the enhanced catalytic performance of the same. The pore structure can be tailored and thus adapted to the needs of the respective phosgenation process. The tailored pore structure is regularly distributed across the catalyst particle.

Accordingly, the volume fraction of the mesopores is at least 50% of the total pore volume, preferably the carbon materials comprise a pore structure wherein from 50% to 90% of the total pore volume resides in mesopores, 10% to 50% of the total pore volume resides in micropores. More preferred the carbon materials comprise a pore structure wherein from 50% to 80% of the total pore volume resides in mesopores and 20% to 50% of the total pore volume resides in micropores. Further more preferred, the carbon materials comprise a pore structure wherein from 60% to 80% of the total pore volume resides in mesopores and 20% to 40% of the total pore volume resides in micropores. Most preferred, the carbon materials comprise a pore structure wherein from 65% to 80% of the total pore volume resides in mesopores and 20% to 35% of the total pore volume resides in micropores.

In other variations of any of the foregoing carbon materials, the carbon materials do not have a substantial volume of pores greater than 30 nm, preferred not have a substantial volume of pores greater than 20 nm. For example, the carbon materials comprise less than 40%, less than 30%, less than 25%, less than 20%, less than 15%, less than 10%, less than 5%, less than 2.5% or even less than 1% of the total pore volume in pores greater than 20 nm.

The porosity of the carbon materials contributes to their enhanced catalytic performance. Preferably, the carbon materials according to the present process comprise a pore volume residing in pores of between 2 and 50 nm of at least 0.45 ml/g, preferred of at least 0.5 ml/g, more preferred of at least 0.6 ml/g, most preferred of at least 0.65 ml/g. Preferably, the carbon materials comprise a pore volume residing in pores of between 2 and 50 nm ranges from about 0.45 ml/g to about 3.0 ml/g, preferred from about 0.5 ml/g to about 2.5 ml/g, more preferred from about 0.6 ml/g to about 2.0 ml/g, most preferred from about 0.65 ml/g to about 1.5 ml/g.

In an preferred alternative, the carbon materials comprise a total pore volume (measured by nitrogen adsorption) of at least 4.00 ml/g, at least 3.75 ml/g, at least 3.50 ml/g, at least 3.25 ml/g, at least 3.00 ml/g, at least 2.75 ml/g, at least 2.50 ml/g, at least 2.25 ml/g, at least 2.00 ml/g, at least 1.90 ml/g, 1.80 ml/g, 1.70 ml/g, 1.60 ml/g, 1.50 ml/g, 1.40 ml/g, at least 1.30 ml/g, at least 1.20 ml/g, at least 1.10 ml/g, at least 1.00 ml/g, at least 0.85 ml/g, at least 0.80 ml/g, at least 0.75 ml/g, at least 0.70 ml/g, at least 0.65 ml/g, at least 0.60 ml/g, at least 0.55 ml/g, at least 0.50 ml/g. For example a total pore volume (measured by nitrogen adsorption) of 0.52 ml/g, 0.57 ml/g, 0.62 ml/g, 0.67 ml/g, 0.72 ml/g, 0.77 ml/g, 0.82 ml/g, 0.87 ml/g, 0.92 ml/g, 0.97 ml/g, 1.02 ml/g, 1.07 ml/g or 1.12 ml/g.

Preferably the carbon materials comprise a total pore volume (measured by nitrogen adsorption) in the range of from 0.5 ml/g to 2.25 ml/g, more preferred in the range of from 0.55 ml/g to 1.75 ml/g, more preferred in the range of from 0.65 ml/g to 1.35 ml/g, further more preferred in the range of from 0.67 ml/g to 1.10 ml/g, most preferred in the range of from 0.68 ml/g to 1.0 ml/g.

The disclosed carbon materials also comprise a high surface area. While not wishing to be bound by theory, it is thought that such high surface area may contribute, at least in part, to their superior catalytic performance. Accordingly, the carbon material comprises a BET specific surface area of at least $100 \text{ m}^2/\text{g}$, at least $300 \text{ m}^2/\text{g}$, at least $500 \text{ m}^2/\text{g}$, at least $1000 \text{ m}^2$ g, at least $1500 \text{ m}^2$ g, at least $2000 \text{ m}^2/\text{g}$, at least $2400 \text{ m}^2/\text{g}$, at least $2500 \text{ m}^2/\text{g}$, at least $2750 \text{ m}^2/\text{g}$ or at least $3000 \text{ m}^2/\text{g}$. Preferably, the BET specific surface area ranges from about $100 \text{ m}^2/\text{g}$ to about $3000 \text{ m}^2/\text{g}$, more preferred from about $500 \text{ m}^2/\text{g}$ to about $2500 \text{ m}^2/\text{g}$, more preferred from about $600 \text{ m}^2/\text{g}$ to about $2000 \text{ m}^2/\text{g}$, and most preferred from about $600 \text{ m}^2/\text{g}$ to about $2000 \text{ m}^2/\text{g}$. For example the carbon material may be activated.

The carbon material comprises low total TXRF impurities. Thus, preferably the total TXRF impurity content of all other TXRF elements in the carbon material (as measured by total reflection x-ray fluorescence) is less than 1000 ppm. More preferably, the total TXRF impurity content of all other TXRF elements in the carbon material is less than 800 ppm, less than 500 ppm, less than 300 ppm, less than 200 ppm, less than 150 ppm, less than 100 ppm, less than 50 ppm, less than 25 ppm, less than 10 ppm, less than 5 ppm or less than 1 ppm.

Preferably, the carbon material is a pyrolyzed dried polymer gel, a pyrolyzed polymer cryogel, a pyrolyzed polymer xerogel, a pyrolyzed polymer aerogel, an activated dried polymer gel, an activated polymer cryogel, an activated polymer xerogel or an activated polymer aerogel.

Preferably, the carbon materials comprise a total impurity content of less than 500 ppm of elements having atomic numbers ranging from 11 to 92 as measured by total reflection x-ray fluorescence. More preferably, the carbon materials comprise a total impurity content of less than 100 ppm of elements having atomic numbers ranging from 11 to 92 as measured by total reflective x-ray fluorescence.

In addition to low content of undesired TXRF impurities, the carbon materials of the present methods may comprise high total carbon content.

In addition to carbon, the carbon material may also comprise oxygen, hydrogen and nitrogen. Preferably, the carbon material comprises at least 75% carbon, more preferred at least 80% carbon, more preferred at least 85% carbon, more preferred at least 90% carbon, more preferred at least 95% carbon, even more preferred at least 96% carbon, further more preferred at least 97% carbon, further more preferred at least 98% carbon or most preferred at least 99% carbon on a weight/weight basis.

Preferably, the carbon material comprises less than 10% oxygen, less than 5% oxygen, less than 3.0% oxygen, less than 2.5% oxygen, less than 1% oxygen or less than 0.5% oxygen on a weight/weight basis.

Preferably, the carbon material comprises less than 10% hydrogen, less than 5% hydrogen, less than 2.5% hydrogen, less than 1% hydrogen, less than 0.5% hydrogen or less than 0.1% hydrogen on a weight/weight basis.

Preferably, the carbon material comprises less than 5% nitrogen, less than 2.5% nitrogen, less than 1% nitrogen, less than 0.5% nitrogen, less than 0.25% nitrogen or less than 0.01% nitrogen on a weight/weight basis.

The oxygen, hydrogen and nitrogen content of the disclosed carbon materials can be determined by combustion analysis. Techniques for determining elemental composition by combustion analysis are well known in the art.

The method may provide carbon material with a total ash content that may, in some instances, have an effect on the catalytic performance of the carbon material.

Accordingly, the ash content of the carbon material ranges from 0.1% to 0.001% weight percent ash, for example the ash content of the carbon material is less than 0.1%, less than 0.08%, less than 0.05%, less than 0.03%, than 0.025%, less than 0.01%, less than 0.0075%, less than 0.005% or less than 0.001%.

Preferably, the ash content of the carbon material is less than 0.03% as calculated from total reflection x-ray fluorescence data. More preferably, the ash content of the carbon material is less than 0.01% as calculated from total reflection x-ray fluorescence data.

Preferably, the carbon material comprises a total TXRF impurity content of less than 500 ppm and an ash content of less than 0.08%. More preferred, the carbon material comprises a total TXRF impurity content of less than 300 ppm and an ash content of less than 0.05%. More preferred, the carbon material comprises a total TXRF impurity content of less than 200 ppm and an ash content of less than 0.05%. Even more preferred, the carbon material comprises a total TXRF impurity content of less than 200 ppm and an ash content of less than 0.025%. Further more preferred, the carbon material comprises a total TXRF impurity content of less than 100 ppm and an ash content of less than 0.02%. Most preferred, the carbon material comprises a total TXRF impurity content of less than 50 ppm and an ash content of less than 0.01%.

The amount of individual TXRF impurities present in the carbon materials obtained from embodiments of the methods provided can be determined by proton induced x-ray emission or total reflective x-ray fluorescence, respectively. Individual TXRF impurities may contribute in different ways to the overall catalytic performance of the carbon materials produced. Thus, preferably, the level of sodium present in the carbon material is less than 1000 ppm, more preferred less than 500 ppm, more preferred less than 100 ppm, even more preferred less than 50 ppm, further more preferred less than 10 ppm, most preferred less than 1 ppm.

As noted above, generally other impurities such as hydrogen, oxygen and/or nitrogen may be present in levels ranging from less than 10% to less than 0.01%.

Preferably, the carbon material comprises undesired TXRF impurities near or below the detection limit of the total reflection x-ray fluorescence analyses, respectively. For example, the carbon material comprises less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

It is alternatively preferred, that the carbon material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission or total reflection x-ray fluorescence.

It is alternatively preferred, that the carbon material comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

It is alternatively preferred, that the carbon material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

It is further alternatively preferred, that the carbon material comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

Preferably, the carbon materials comprise less than 10 ppm iron.

Preferably, the carbon materials comprise less than 3 ppm nickel.

Preferably, the carbon materials comprise less than 30 ppm sulfur.

Preferably, the carbon materials comprise less than 1 ppm chromium.

Preferably, the carbon materials comprise less than 1 ppm copper.

Preferably, the carbon materials comprise less than 1 ppm zinc.

The following carbon materials are useful for the process of this invention: Carbon materials include ultrapure as well as amorphous and crystalline carbon materials. Examples of carbon materials include, but are not limited to, activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like as described in WO 2012/092210.

One common method for producing carbon materials useful as catalysts for the present invention is to pyrolyze an existing carbon-containing material (e.g., coconut fibers or tire rubber). This results in a carbon material with relatively low surface area which can subsequently be over-activated to produce a material with the surface area and porosity necessary for the desired application.

Activated carbon materials can also be prepared by chemical activation for example, treatment of a carbon-containing material with an acid, base or salt (e.g., phosphoric acid, potassium hydroxide, sodium hydroxide, zinc chloride, etc.) followed by heating results in an activated carbon material.

Particularly preferred carbon materials are pyrolyzed polymer aerogels or activated polymer aerogels, their production and product characteristics are described in WO 2012/092210.

According to the specification of WO 2012/092210, one approach for producing such high surface area activated carbon materials is to prepare a synthetic polymer from carbon-containing organic building blocks (e.g., a polymer gel). As with the existing organic materials, the synthetically prepared polymers are dried (e.g., by evaporation or freeze drying) pyrolyzed and activated to produce an activated carbon material (e.g., an aerogel or xerogel). In contrast to the traditional approach described above, the intrinsic porosity of the synthetically prepared polymer results in higher process yields because less material is lost during the activation step.

One preferred method for the production of the carbon material comprising:

a) combining a solvent, a catalyst, a first monomer and a second monomer to yield a reaction mixture;

b) holding the reaction mixture at a holding temperature sufficient to co-polymerize the first and second monomer to yield a resin mixture;

c) heating the resin mixture at a curing temperature, thereby forming a polymer composition comprising the solvent and a polymer formed from co-polymerizing the first and second monomer, wherein the solvent concentration in the polymer composition is at least 40 wt %, based on total weight of the polymer composition; and d) pyrolyzing the polymer composition at a pyrolysis temperature thereby substantially removing the solvent and pyrolyzing the polymer to yield a carbon material.

Another preferred method comprising:

a) combining a solvent, a catalyst, a first monomer and a second monomer to yield a reaction mixture, and maintaining the reaction mixture at a reaction temperature for a reaction time;

b) holding the reaction mixture at a holding temperature, sufficient to co-polymerize the first and second monomer to yield a resin mixture;

c) heating the resin mixture up to a curing temperature, thereby forming a polymer composition comprising the solvent and a polymer formed from co-polymerizing the first and second monomer;

d) pyrolyzing the polymer composition at a pyrolysis temperature, thereby substantially removing the solvent and pyrolyzing the polymer to yield a carbon material; and e) optionally activating the carbon material at an activation temperature, thereby increasing the surface area and pore volume to a desired level to yield a high performing carbon material.

Generally, the process according to the invention can be performed in any multi-tubular reactor suitable for the production of phosgene by gas phase reaction of carbon monoxide and chlorine in the presence of a carbon catalyst.

A typical phosgene reactor which can be used for the process of the present invention is for example, disclosed in the international patent application WO 03/072273. The reactor has a bundle of contact tubes, which are sealed parallel to each other in the longitudinal direction of the reactor in upper and lower tube bottoms. At both ends of the reactor, hoods are provided, in which gas distributors are arranged. In the space between the contact tubes a liquid heat exchanger medium is used, deflection plates are arranged percular to the longitudinal direction. In the area of the openings, the reactor is unpiped, since in these areas only insufficient cooling of the contact tubes would be possible due to the transition of the coolant flow from a transverse to a longitudinal flow. For the supply and dissipating of the heat exchanger medium, nozzles or partial ring channels are provided. Optionally a compensator can be used on the reactor sheath to compensate for thermal stress.

A suitable reactor can be divided in the longitudinal direction of the contact tubes into at least two cooling zones, which can be separated from each other, for example, by intermediate bottoms. Different heat carriers can be used in the different cooling zones, the selection of which can be adapted to the thermal conditions in the respective cooling zones. Preferably the same heat carrier is used. In this case, for example, in a cooling zone with particularly high heat generation, boiler cooling can be used, while in another cooling zone liquid cooling is used. In the case of boiler cooling, it is preferable to provide no deflection plates or specially designed deflection plates, in which a backlog of ascending gas bubbles is prevented.

As fluid heat carriers, different substances and mixtures of substances can be used, which are suitable, for example, due to their heat capacity or due to their evaporation enthalpy, to dissipate the reaction heat. Typically, a liquid heat carrier is used, such as water, dibenzyltoluene (Marlotherm) or mono-chlorobenzene.

The contact tubes of the reactor may have a length L in the range of 1.5 to 12 m, preferably from 2.5 to 8 m.

A suitable reactor for the process according to the invention can be equipped with 1000 to 10000 contact tubes and can be cylindrical, with an inner diameter of preferably 0.3 to 6 m, further preferred from 2 to 5 m, in particular from 2.5 to 4 m.

In the reactor, a bundle, i.e. a large number of contact tubes, is arranged parallel to each other in the reactor longitudinal direction.

Each contact tube preferably has a wall thickness in the range of 2.0 to 4.0 mm, in particular from 2.5 to 3.0 mm, and an inner pipe diameter in the range of 20 to 90 mm, preferably in the range of 30 to 50 mm.

The contact tubes are made of a corrosion-resistant material, for example stainless steel, preferably duplex steel 1.4462, stainless steel 1.4571 or stainless steel 1.4541 or also formed of nickel-based alloys or nickel. Preferably, the tube bottoms or the entire reactor are formed from the aforementioned materials, in particular of duplex or stainless steel.

However, the reactor sheath and the bases can also be made of cheaper metals and metal alloys, such as blacksteel. Components that come into contact with reactants, can then be plated with a protective layer made of higher-quality materials.

Both reactor ends are bounded to the outside by hoods. A hood feeds the reaction mixture to the contact tubes, and the product flow is removed through the hood at the other end of the reactor.

In the hood, in which the reaction mixture is fed, are preferably gas distributors to uniform distribute the gas flow, for example in the form of a plate, in particular a perforated plate.

The contact tubes are filled with the solid catalyst. The catalyst filling in the contact tubes preferably has a gap volume of 0.33 to 0.6, in particular from 0.33 to 0.45. The gap volume refers to the catalyst filling, in which the solid catalyst is assumed to be a solid body. The porosity of the catalyst bodies themselves, which can be, for example, 50%, is not taken into account. Preferably, the surface load in process of the invention is in the range of 0.5 kg phosgene/$m^2$s to 6 kg phosgene/$m^2$s, more preferably in the range of 0.7 kg phosgene/$m^2$s to 5 kg phosgene/$m^2$s, even more preferable in the range of 0.7 kg phosgene/$m^2$s to 4 kg phosgene/$m^2$s, particularly preferably in the range of 0.8 kg phosgene/$m^2$s to 3.5 kg phosgene/$m^2$s.

The increase in the surface load can be achieved in existing reactors by a corresponding adjustment of the operating parameters, in particular an increase in the volume flow of the reactants. Newly designed reactors, however, can already be designed constructively for an optimized operation with the surface load provided.

The increase in the surface load can be achieved by a reduction in the number of contact tubes in the reactor with corresponding extension of the length of the contact tubes. For example, a halving of the number of contact pipes with the same pipe diameter doubles both the surface load and the pipe length. The corresponding reactors are therefore leaner, i.e. they have a smaller diameter at comparable GHSV, which is advantageous both in terms of production and cooling of the contact tubes. Due to the higher gas speed and higher filling length, the pressure loss in the contact tubes increases, but at the same time this leads to a better distribution of the feed stream on all contact tubes.

The surface load can also be realized at the same phosgene capacity and catalyst quantity at unchanged number of pipes by a reduction of the diameter of the individual contact tubes and again a corresponding extension of the contact tubes.

Of course, combinations of both measures are also conceivable, i.e. reduction of the number of pipes as well as reduction of the pipe diameter of the individual pipes.

Preferably, the feed stream in the process of the invention has a stoichiometric excess of carbon monoxide to chlorine of 0.001 to 50 mol %, so that an almost complete conversion of chlorine is guaranteed. If fluctuating chlorine concentrations in the chlorine input stream have to be expected, one will rather choose a higher excess carbon monoxide, but in general the excess will be chosen as low as possible for cost reasons, as long as the complete chlorine conversion is still guaranteed.

The feed stream is preferably supplied with an absolute pressure in the range of 0.5 to 20 bar. Particularly preferably, the feed stream is fed with an overpressure, for example at an absolute pressure of 3 to 7 bar (absolute). The higher the pressure of the resulting reaction mixture at the output of the reactor, the higher the phosgene contained in the reaction mixture can be condensed. Preferably, the pressure of the reaction mixture at the output of the reactor is still so high that the phosgene can be condensed at least partially with cooling water.

Additionally, it was an object of the present invention to provide a new reaction mixture for producing phosgene. In particular, it was necessary to provide a new reaction mixture comprising a catalyst for the production of phosgene which presents a higher catalytic activity and longer catalytic lifetime compared to those commercially available and reduces the formation of CCl4 during phosgene preparation.

It was surprisingly found that the reaction mixture for preparing phosgene permits to improve process efficiency. In particular the catalyst comprised therein presents a higher catalytic activity and longer catalytic lifetime compared to those commercially available and reduces the formation of CCl4 during phosgene preparation.

Therefore, the present invention relates also to a reaction mixture for preparing phosgene, the mixture comprising (i) a catalyst for preparing phosgene comprising a porous material comprising carbon, micropores and mesopores, wherein said micropores have a pore diameter of less than 2 nm and wherein said mesopores have a pore diameter in the range of from 2 to 50 nm, wherein the volume of the mesopores of the porous material is of at least 0.45 ml/g; and (ii) a gas stream G comprising carbon monoxide (CO) and chlorine ($Cl_2$).

It is preferred that the pore diameter of the micropores be determined according to DIN 66135-2. It is preferred that the pore diameter of the mesopores be determined according to DIN 66134. It is preferred that the volume of the mesopores of the porous material be deter-mined according to dual-isotherm Nonlocal Density Functional Theoretical (NLDFT) Advanced Pore Size Distribution (PSD) technique. It is more preferred that the pore diameter of the micropores be determined according to DIN 66135-2, that the pore diameter of the mesopores be determined according to DIN 66134 and that the volume of the mesopores of the porous mate-rial be determined according to dual-isotherm Nonlocal Density Functional Theoretical (NLDFT) Advanced Pore Size Distribution (PSD) technique.

Preferably the ratio of the volume of the mesopores of the porous material of the catalyst (i) relative to the volume of the micropores of the porous material of the catalyst (i) is of at least 1:1, more preferably in the range of from 1.1:1 to 6:1, more preferably in the range of from 1.15:1 to 5:1, more preferably in the range of from 1.2:1 to 4:1. It is more preferred that the volume of the mesopores of the porous material and the volume of the micropores of the porous material be determined according to dual-isotherm NLDFT Advanced PSD technique.

Preferably the ratio of the volume of the mesopores of the porous material of the catalyst (i) relative to the total pore volume of the porous material of the catalyst (i), is of at least 0.5:1, preferably in the range of from 0.5:1 to 0.9:1, more preferably in the range of from 0.55:1 to 0.85:1, more preferably in the range of from 0.6:1 to 0.8:1, more prefer-ably in the range of from 0.65:1 to 0.8:1. It is more preferred that the volume of the mesopores of the porous mate-rial and the total pore volume of the porous material be determined according to dual-isotherm NLDFT Advanced PSD technique.

It is preferred that the volume of the mesopores of the porous material of the catalyst (i) is of at least 0.5 ml/g.

As to the total pore volume of the porous material of the catalyst (i), it is preferred that it is in the range of from 0.5 to 2.25 ml/g, more preferably in the range of from 0.55 to 1.75 ml/g, more preferably in the range of from 0.65 to 1.70 ml/g. It is more preferred that the total pore volume of the porous material be determined according to dual-isotherm NLDFT Advanced PSD technique.

Preferably less than or equal to 40%, more preferably less than or equal to 30%, more preferably less than or equal to 25%, more preferably less than or equal to 20%, more preferably less than or equal to 15%, more preferably less than or equal to 10%, more preferably less than or equal to 5%, more preferably less than or equal to 2.5%, more preferably less than or equal to 1%, of the total pore volume of the porous material of the catalyst (i) resides in mesopores having a pore diameter of greater than 20 nm.

It is preferred that the volume of the mesopores of the porous material of the catalyst (i) is in the range of from 0.50 to 0.54 ml/g, more preferably in the range of from 0.51 to 0.53 ml/g, and that the ratio of the volume of the mesopores of the porous material of the catalyst (i) relative to the total pore volume of the porous material of the catalyst (i) is in the range of from 0.70:1 to 0.75:1, more preferably in the range of from 0.72:1 to 0.74:1. It is more preferred that the volume of the mesopores of the porous material and the total pore volume of the porous mate-rial be determined according to dual-isotherm NLDFT Advanced PSD technique.

Alternatively, it is preferred that the volume of the mes-opores of the porous material of the catalyst (i) is in the range of from 0.64 to 0.70 ml/g, preferably in the range of from 0.65 to 0.67 ml/g, and that the ratio of the volume of the mesopores of the porous material of the catalyst (i) relative to the total pore volume of the porous material of the catalyst (i), is in the range of from 0.72:1 to 0.78:1, more preferably in the range of from 0.73:1 to 0.76:1. As indicated in the foregoing, it is more preferred that the volume of the mesopores of the porous material and the total pore volume of the porous material be determined according to dual-isotherm NLDFT Advanced PSD technique.

In the context of the present invention, it is preferred that the volume of the micropores of the porous material of the catalyst (i), more preferably determined according to dual-isotherm NLDFT Advanced PSD technique, is of at most 0.7 ml/g, more preferably of at most 0.6 ml/g.

As to the BET specific surface area of the porous material of the catalyst (i), it is preferred that it is of at least 500 m2/g, more preferably in the range of from 500 to 2500 $m^2/g$, more prefer-ably in the range of from 550 to 1800 $m^2/g$, more preferably in the range of from 600 to 1500 $m^2/g$.

As to the total specific surface area of the porous material of the catalyst (i), measured according to dual-isotherm NLDFT Advanced PSD technique, it is preferred that it is of at least 600 $m^2/g$, more preferably in the range of from 650 to 2000 $m^2/g$, more preferably in the range of from 700 to 1800 $m^2/g$.

Preferably the specific surface area of the porous material of the catalyst (i) induced by the mesopores, measured according to dual-isotherm NLDFT Advanced PSD tech-nique, is of in the range of from 70 to 250 $m^2/g$, more preferably in the range of from 80 to 170 $m^2/g$.

It is preferred that the ratio of the specific surface area of the porous material of the catalyst (i) induced by the mesopores relative to the total specific surface area of the porous material of the catalyst (i) is in the range of from 0.07:1 to 0.40:1, more preferably in the range of from 0.07:1 to 0.20:1.

Preferably the porous material of the catalyst (i) is a pyrolyzed carbon aerogel.

Preferably the porous material of the catalyst (i) is an activated pyrolyzed carbon aerogel.

Preferably from 99 to 100 weight-%, more preferably from 99.5 to 100 weight-%, more preferably from 99.9 to 100 weight-%, of the porous material of the catalyst (i) consists of the carbon.

Preferably less than or equal to 0.5 weight-% of the porous material of the catalyst (i) consists of oxygen.

Preferably less than or equal to 0.5 weight-%, more preferably less than or equal to 0.1 weight %, of the porous material of the catalyst (i) consists of hydrogen.

Preferably less than or equal to 0.01 weight-%, of the porous material of the catalyst (i) consists of nitrogen.

Preferably the ash content of the porous material of the catalyst (i) is of less than or equal to 0.1 weight-%, more preferably less than or equal to 0.08 weight-%, more pref-erably less than or equal to 0.05 weight-%, more preferably less than or equal to 0.03 weight-%, more preferably less than or equal to 0.025 weight-%, more preferably less than or equal to 0.01 weight-%, more preferably less than or equal to 0.0075 weight-%, more preferably less than or equal to 0.005 weight-%, more preferably less than or equal to 0.001 weight-%, based on the weight of said porous material, as calculated from total reflection x-ray fluorescence data.

Preferably the porous material of the catalyst (i) has a total impurity content of elements having atomic numbers ranging from 11 to 92 as measured by total reflection x-ray fluorescence (TXRF) of less than 500 ppm, more preferably less than 300 ppm, more preferably less than 200 ppm, more preferably less than 100 ppm.

It is preferred that the porous material of the catalyst (i) comprises a total TXRF impurity content of less than or equal to 500 ppm and an ash content of less than or equal to 0.08 weight-% based on the weight of said porous material. It is more preferred that the porous material of the catalyst (i) comprises a total TXRF impurity content of less than or equal to 300 ppm and an ash content of less than 0.05 weight-% based on the weight of said porous material. It is more preferred that the porous material of the catalyst (i) comprises a total TXRF impurity content of less than or equal to 200 ppm and an ash content of less than 0.05 weight-% based on the weight of said porous material. It is more preferred that the porous material of the catalyst (i) comprises a total TXRF impurity content of less than or equal to 200 ppm and an ash content of less than 0.025 weight-% based on the weight of said porous material. It is more preferred that the porous material of the catalyst (i) comprises a total TXRF impurity content of less than or equal to 100 ppm and an ash content of less than 0.02 weight-% based on the weight of said porous material. It is more preferred that the porous material of the catalyst (i) comprises a total TXRF impurity content of less than or equal to 50 ppm and an ash content of less than 0.01 weight-% based on the weight of said porous material.

The amount of individual TXRF impurities present in the porous material comprised in the catalyst (i) can be determined by proton induced x-ray emission or total reflective x-ray fluorescence, respectively. Individual TXRF impurities may contribute in different ways to the overall catalytic performance of the catalyst (i) comprising said porous material. Thus, it is preferred that the level of sodium present in the porous material is less than or equal to 1000 ppm, less than or equal to 500 ppm, less than or equal to 100 ppm, less than or equal to 50 ppm, less than or equal to 10 ppm, or less than or equal to 1 ppm.

Preferably the porous material comprised in the catalyst (i) comprises undesired TXRF impurities near or below the detection limit of the total reflection x-ray fluorescence analyses, respectively. For example, it is preferred that said porous material comprises less than or equal to 50 ppm sodium, less than or equal to 15 ppm magnesium, less than or equal to 10 ppm aluminum, less than or equal to 8 ppm silicon, less than or equal to 4 ppm phosphorous, less than or equal to 3 ppm sulfur, less than or equal to 3 ppm chlorine, less than or equal to 2 ppm potassium, less than or equal to 3 ppm calcium, less than or equal to 2 ppm scandium, less than or equal to 1 ppm titanium, less than or equal to 1 ppm vanadium, less than or equal to 0.5 ppm chromium, less than or equal to 0.5 ppm or equal to manganese, less than or equal to 0.5 ppm iron, less than or equal to 0.25 ppm cobalt, less than or equal to 0.25 ppm nickel, less than or equal to 0.25 ppm copper, less than or equal to 0.5 ppm zinc, less than or equal to 0.5 ppm gallium, less than or equal to 0.5 ppm germanium, less than or equal to 0.5 ppm arsenic, less than or equal to 0.5 ppm selenium, less than or equal to 1 ppm bromine, less than or equal to 1 ppm rubidium, less than or equal to 1.5 ppm strontium, less than or equal to 2 ppm yttrium, less than or equal to 3 ppm zirconium, less than or equal to 2 ppm niobium, less than or equal to 4 ppm molybdenum, less than or equal to 4 ppm technetium, less than or equal to 7 ppm rubidium, less than or equal to 6 ppm rhodium, less than or equal to 6 ppm palladium, less than or equal to 9 ppm silver, less than or equal to 6 ppm cadmium, less than or equal to 6 ppm indium, less than or equal to 5 ppm tin, less than or equal to 6 ppm antimony, less than or equal to 6 ppm tellurium, less than or equal to 5 ppm iodine, less than or equal to 4 ppm cesium, less than or equal to 4 ppm barium, less than or equal to 3 ppm lanthanum, less than or equal to 3 ppm cerium, less than or equal to 2 ppm praseodymium, less than or equal to 2 ppm neodymium, less than or equal to 1.5 ppm promethium, less than or equal to 1 ppm samarium, less than or equal to 1 ppm europium, less than or equal to 1 ppm gadolinium, less than or equal to 1 ppm terbium, less than or equal to 1 ppm dysprosium, less than or equal to 1 ppm holmium, less than or equal to 1 ppm erbium, less than or equal to 1 ppm thulium, less than or equal to 1 ppm ytterbium, less than or equal to 1 ppm lutetium, less than or equal to 1 ppm hafnium, less than or equal to 1 ppm tantalum, less than or equal to 1 ppm tungsten, less than or equal to 1.5 ppm rhenium, less than or equal to 1 ppm osmium, less than or equal to 1 ppm iridium, less than or equal to 1 ppm platinum, less than or equal to 1 ppm silver, less than or equal to 1 ppm mercury, less than or equal to 1 ppm thallium, less than or equal to 1 ppm lead, less than or equal to 1.5 ppm bismuth, less than 2 or equal to ppm thorium, or less than or equal to 4 ppm uranium.

It is preferred that the porous material of the catalyst (i) comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission or total reflection x-ray fluorescence.

It is alternatively preferred that the porous material of the catalyst (i) comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc as measured by proton induced x-ray emission or total reflection x-ray fluorescence.

It is alternatively preferred that the porous material of the catalyst (i) comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc as measured by proton induced x-ray emission or total reflection x-ray fluorescence.

It is alternatively preferred that the porous material of the catalyst (i) comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese as measured by proton induced x-ray emission or total reflection x-ray fluorescence.

It is preferred that the porous material of the catalyst (i) comprises less than 10 ppm iron as measured by proton induced x-ray emission or total reflection x-ray fluorescence.

It is preferred that the porous material of the catalyst (i) comprises less than 3 ppm nickel as measured by proton induced x-ray emission or total reflection x-ray fluorescence.

It is preferred that the porous material of the catalyst (i) comprises less than 30 ppm sulfur as measured by proton induced x-ray emission or total reflection x-ray fluorescence.

It is preferred that the porous material of the catalyst (i) comprises less than 1 ppm chromium as measured by proton induced x-ray emission or total reflection x-ray fluorescence.

It is preferred that the porous material of the catalyst (i) comprises less than 1 ppm copper as measured by proton induced x-ray emission or total reflection x-ray fluorescence.

It is preferred that the porous material of the catalyst (i) comprises less than 1 ppm zinc as measured by proton induced x-ray emission or total reflection x-ray fluorescence.

Preferably from 99 to 100 weight-%, more preferably from 99.5 to 100 weight-%, more preferably from 99.9 to 100 weight-%, of the catalyst (i) consists of the porous material. In other words, it is preferred that the catalyst (i) consists essentially of, more preferably consists of, the porous material.

It is more preferred that the catalyst (i) be the porous material.

It is preferred that the gas stream G consists of carbon monoxide and chlorine.

Further, it was also an object of the present invention to provide improved catalysts for producing phosgene. In particular, it was necessary to provide new catalysts for the production of phosgene which present a higher catalytic activity and longer catalytic life time compared to those commercially available and reduce the formation of $CCl_4$ during phosgene preparation.

It was surprisingly found that the catalysts for preparing phosgene according to the present invention present higher catalytic activities and longer catalytic life time compared to those commercially available and reduce the formation of $CCl_4$ during phosgene preparation.

Thus, the present invention further relates to a catalyst for preparing phosgene comprising a porous material comprising carbon, micropores and mesopores, wherein said micropores have a pore diameter of less than 2 nm and wherein said mesopores have a pore diameter in the range of from 2 to 50 nm, wherein the volume of the mesopores of the porous material is in the range of from 0.50 to 0.54 ml/g and the ratio of the volume of the mesopores of the porous material relative to the total pore volume of the porous material is in the range of from 0.70:1 to 0.75:1, wherein from 99 to 100 weight-% of the porous material consist of carbon.

It is preferred that the pore diameter of the micropores be determined according to DIN 66135-2. It is preferred that the pore diameter of the mesopores be determined according to DIN 66134. It is preferred that the volume of the mesopores of the porous material and the total pore volume of the porous material be determined according to dual-isotherm Nonlocal Density Functional Theoretical (NLDFT) Advanced Pore Size Distribution (PSD) technique. It is more preferred that the pore diameter of the micropores be determined according to DIN 66135-2, that the pore diameter of the mesopores be determined according to DIN 66134 and that the volume of the mesopores of the porous material and the total pore volume of the porous material be determined according to dual-isotherm Nonlocal Density Functional Theoretical (NLDFT) Advanced Pore Size Distribution (PSD) technique.

Preferably the volume of the mesopores of the porous material is in the range of from 0.51 to 0.53 ml/g, and the ratio of the volume of the mesopores of the porous material relative to the total pore volume of the porous material is in the range of from 0 0.72:1 to 0.74:1.

Thus, the present invention further relates to a catalyst for preparing phosgene comprising a porous material comprising carbon, micropores and mesopores, wherein said micropores have a pore diameter of less than 2 nm and wherein said mesopores have a pore diameter in the range of from 2 to 50 nm, wherein the volume of the mesopores of the porous material is in the range of from 0.64 to 0.70 ml/g, and the ratio of the volume of the mesopores of the porous material relative to the total pore volume of the porous material is in the range of from 0.72:1 to 0.78:1, wherein from 99 to 100 weight-% of the porous material consist of carbon.

It is preferred that the pore diameter of the micropores be determined according to DIN 66135-2. It is preferred that the pore diameter of the mesopores be determined according to DIN 66134. It is preferred that the volume of the mesopores of the porous material and the total pore volume of the porous material be determined according to dual-isotherm Nonlocal Density Functional Theoretical (NLDFT) Advanced Pore Size Distribution (PSD) technique. It is more preferred that the pore diameter of the micropores be determined according to DIN 66135-2, that the pore diameter of the mesopores be determined according to DIN 66134 and that the volume of the mesopores of the porous material and the total pore volume of the porous material be determined according to dual-isotherm Nonlocal Density Functional Theoretical (NLDFT) Advanced Pore Size Distribution (PSD) technique.

Preferably the volume of the mesopores of the porous material is in the range of from 0.65 to 0.67 ml/g, and the ratio of the volume of the mesopores of the porous material relative to the total pore volume of the porous material, is in the range of from 0.73:1 to 0.76:1.

The following preferred parameters/features relate to both above disclosed catalysts for preparing phosgene.

It is preferred that the ratio of the volume of the mesopores of the porous material relative to the volume of the micropores of the porous material is of at least 1:1, more preferably in the range of from 1.1:1 to 6:1, more preferably in the range of from 1.15:1 to 5:1, more preferably in the range of from 1.2:1 to 4:1, the volume of the mesopores of the porous material and the volume of the micropores of the porous material being more preferably determined according to dual-isotherm NLDFT Advanced PSD technique.

Preferably less than or equal to 40%, more preferably less than or equal to 30%, more preferably less than or equal to 25%, more preferably less than or equal to 20%, more preferably less than or equal to 15%, more preferably less than or equal to 10%, more preferably less than or equal to 5%, more preferably less than or equal to 2.5%, more preferably less than or equal to 1%, of the total pore volume of the porous material resides in mesopores having a pore diameter of greater than 20 nm.

Preferably the volume of the micropores of the porous material, more preferably determined according to dual-isotherm NLDFT Advanced PSD technique, is of at most 0.7 ml/g, more preferably of at most 0.6 ml/g.

It is preferred that the BET specific surface area of the porous material is of at least 500 m2/g, more preferably in the range of from 500 to 2500 m2/g, more preferably in the range of from 550 to 1800 m2/g, more preferably in the range of from 600 to 1500 m2/g.

As to the total specific surface area of the porous material, measured according to dual-isotherm NLDFT Advanced PSD technique, it is preferred that it is of at least 600 m²/g, more preferably in the range of from 650 to 2000 m²/g, more preferably in the range of from 700 to 1800 m²/g.

As to the specific surface area of the porous material induced by the mesopores, measured according to dual-isotherm NLDFT Advanced PSD technique, it is preferred that it is of in the range of from 70 to 250 m²/g, more preferably in the range of from 80 to 170 m²/g.

Preferably the ratio of the specific surface area of the porous material induced by the mesopores relative to the total specific surface area of the porous material is in the range of from 0.07:1 to 0.40:1, more preferably in the range of from 0.07:1 to 0.20:1.

Preferably the porous material is a pyrolyzed carbon aerogel.

Preferably the porous material is an activated pyrolyzed carbon aerogel.

Preferably from 99.5 to 100 weight-%, more preferably from 99.9 to 100 weight-%, of the porous material consists of the carbon.

It is preferred that the porous material essentially consists of, more preferably consists of, carbon.

Preferably less than or equal to 0.5 weight-% of the porous material consists of oxygen.

Preferably less than or equal to 0.5 weight-%, more preferably less than or equal to 0.1 weight %, of the porous material consists of hydrogen.

Preferably less than or equal to 0.01 weight-%, of the porous material consists of nitrogen.

Preferably the ash content of the porous material is of less than or equal to 0.1 weight-%, more preferably less than or equal to 0.08 weight-%, more preferably less than or equal to 0.05 weight-%, more preferably less than or equal to 0.03 weight-%, more preferably less than or equal to 0.025 weight-%, more preferably less than or equal to 0.01 weight-%, more preferably less than or equal to 0.0075 weight-%, more preferably less than or equal to 0.005 weight-%, more preferably less than or equal to 0.001 weight-%, based on the weight of said porous material, as calculated from total reflection x-ray fluorescence data.

Preferably the porous material has a total impurity content of elements having atomic numbers ranging from 11 to 92 as measured by total reflection x-ray fluorescence (TXRF) of less than or equal to 500 ppm, more preferably less than or equal to 300 ppm, more preferably less than or equal to 200 ppm, more preferably less than or equal to 100 ppm.

It is preferred that the porous material comprises a total TXRF impurity content of less than or equal to 500 ppm and an ash content of less than or equal to 0.08 weight-% based on the weight of said porous material. It is more preferred that the porous material comprises a total TXRF impurity content of less than or equal to 300 ppm and an ash content of less than 0.05 weight-% based on the weight of said porous material. It is more preferred that the porous material comprises a total TXRF impurity content of less than or equal to 200 ppm and an ash content of less than 0.05 weight-% based on the weight of said porous material. It is more preferred that the porous material comprises a total TXRF impurity content of less than or equal to 200 ppm and an ash content of less than 0.025 weight-% based on the weight of said porous material. It is more preferred that the porous material comprises a total TXRF impurity content of less than or equal to 100 ppm and an ash content of less than 0.02 weight-% based on the weight of said porous material. It is more preferred that the porous material comprises a total TXRF impurity content of less than or equal to 50 ppm and an ash content of less than 0.01 weight-% based on the weight of said porous material.

The amount of individual TXRF impurities present in the porous material can be determined by proton induced x-ray emission or total reflective x-ray fluorescence, respectively. Individual TXRF impurities may contribute in different ways to the overall catalytic performance of the catalyst (i) comprising said porous material. Thus, it is preferred that the level of sodium pre-sent in the porous material is less than or equal to 1000 ppm, less than or equal to 500 ppm, less than or equal to 100 ppm, less than or equal to 50 ppm, less than or equal to 10 ppm, or less than or equal to 1 ppm.

Preferably the porous material comprises undesired TXRF impurities near or below the detection limit of the total reflection x-ray fluorescence analyses, respectively. For example, it is preferred that said porous material comprises less than or equal to 50 ppm sodium, less than or equal to 15 ppm magnesium, less than or equal to 10 ppm aluminum, less than or equal to 8 ppm silicon, less than or equal to 4 ppm phosphorous, less than or equal to 3 ppm sulfur, less than or equal to 3 ppm chlorine, less than or equal to 2 ppm potassium, less than or equal to 3 ppm calcium, less than or equal to 2 ppm scandium, less than or equal to 1 ppm titanium, less than or equal to 1 ppm vanadium, less than or equal to 0.5 ppm chromium, less than or equal to 0.5 ppm or equal to manganese, less than or equal to 0.5 ppm iron, less than or equal to 0.25 ppm cobalt, less than or equal to 0.25 ppm nickel, less than or equal to 0.25 ppm copper, less than or equal to 0.5 ppm zinc, less than or equal to 0.5 ppm gallium, less than or equal to 0.5 ppm germanium, less than or equal to 0.5 ppm arsenic, less than or equal to 0.5 ppm selenium, less than or equal to 1 ppm bromine, less than or equal to 1 ppm rubidium, less than or equal to 1.5 ppm strontium, less than or equal to 2 ppm yttrium, less than or equal to 3 ppm zirconium, less than or equal to 2 ppm niobium, less than or equal to 4 ppm molybdenum, less than or equal to 4 ppm technetium, less than or equal to 7 ppm rubidium, less than or equal to 6 ppm rhodium, less than or equal to 6 ppm palladium, less than or equal to 9 ppm silver, less than or equal to 6 ppm cadmium, less than or equal to 6 ppm indium, less than or equal to 5 ppm tin, less than or equal to 6 ppm antimony, less than or equal to 6 ppm tellurium, less than or equal to 5 ppm iodine, less than or equal to 4 ppm cesium, less than or equal to 4 ppm barium, less than or equal to 3 ppm lanthanum, less than or equal to 3 ppm cerium, less than or equal to 2 ppm praseodymium, less than or equal to 2 ppm neodymium, less than or equal to 1.5 ppm promethium, less than or equal to 1 ppm samarium, less than or equal to 1 ppm europium, less than or equal to 1 ppm gadolinium, less than or equal to 1 ppm terbium, less than or equal to 1 ppm dysprosium, less than or equal to 1 ppm holmium, less than or equal to 1 ppm erbium, less than or equal to 1 ppm thulium, less than or equal to 1 ppm ytterbium, less than or equal to 1 ppm lutetium, less than or equal to 1 ppm hafnium, less than or equal to 1 ppm tantalum, less than or equal to 1 ppm tungsten, less than or equal to 1.5 ppm rhenium, less than or equal to 1 ppm osmium, less than or equal to 1 ppm iridium, less than or equal to 1 ppm platinum, less than or equal to 1 ppm silver, less than or equal to 1 ppm mercury, less than or equal to 1 ppm thallium, less than or equal to 1 ppm lead, less than or equal to 1.5 ppm bismuth, less than 2 or equal to ppm thorium, or less than or equal to 4 ppm uranium.

It is preferred that the porous material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission or total reflection x-ray fluorescence.

It is alternatively preferred that the porous material comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc as measured by proton induced x-ray emission or total reflection x-ray fluorescence.

It is alternatively preferred that the porous material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc as measured by proton induced x-ray emission or total reflection x-ray fluorescence.

It is alternatively preferred that the porous material comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese as measured by proton induced x-ray emission or total reflection x-ray fluorescence.

It is preferred that the porous material comprises less than 10 ppm iron as measured by proton induced x-ray emission or total reflection x-ray fluorescence.

It is preferred that the porous material comprises less than 3 ppm nickel as measured by proton induced x-ray emission or total reflection x-ray fluorescence.

It is preferred that the porous material comprises less than 30 ppm sulfur as measured by proton induced x-ray emission or total reflection x-ray fluorescence.

It is preferred that the porous material comprises less than 1 ppm chromium as measured by proton induced x-ray emission or total reflection x-ray fluorescence.

It is preferred that the porous material comprises less than 1 ppm copper as measured by proton induced x-ray emission or total reflection x-ray fluorescence.

It is preferred that the porous material comprises less than 1 ppm zinc as measured by proton induced x-ray emission or total reflection x-ray fluorescence.

Preferably from 99 to 100 weight-%, more preferably from 99.5 to 100 weight-%, more preferably from 99.9 to 100 weight-%, of the catalyst consists of the porous material. In other words, it is preferred that the catalyst consists essentially of, more preferably consists of, the porous material. It is more preferred that the catalyst be the porous material.

Furthermore, the present invention further relates to a use of a catalyst according to the present invention for preparing phosgene.

Furthermore, the present invention relates to a use of a reaction mixture according to the present invention for preparing phosgene.

The present invention relates to a process for preparing a catalyst (i) of the reaction mixture for preparing phosgene according to the present invention or a catalyst according to the pre-sent invention, the process comprising a) preparing a mixture comprising a solvent, a catalyst, a first monomer and a second monomer;

b) co-polymerizing the first and second monomer of the mixture obtained according to a), obtaining a resin mixture;

c) heating the resin mixture obtained according to b) at a curing temperature, obtaining a polymer composition comprising the solvent and a polymer formed from co-polymerizing the first and second monomer, wherein the solvent concentration in the polymer composition is at least 40 weight-%, based on the total weight of the polymer composition; and d) pyrolyzing the polymer composition obtained according to c) at a pyrolysis temperature thereby substantially removing the solvent and pyrolyzing the polymer, obtaining the catalyst.

The present invention further relates to a process for preparing a catalyst (i) of the reaction mixture for preparing phosgene according to the present invention or a catalyst according to the present invention, the process comprising 1) preparing a mixture comprising a solvent, a catalyst, a first monomer and a second monomer, and maintaining the reaction mixture at a reaction temperature for a reaction time;

2) co-polymerizing the first and second monomer of the mixture according to 1), obtaining a resin mixture;

3) curing the resin mixture obtained according to 2) at a curing temperature, obtaining a polymer composition comprising the solvent and a polymer formed from co-polymerizing the first and second monomer according to 2);

4) pyrolyzing the polymer composition obtained according to 3) at a pyrolysis temperature, thereby substantially removing the solvent and pyrolyzing the polymer, obtaining a carbon material; and 5) optionally activating the carbon material at an activation temperature, thereby increasing the surface area and pore volume to a desired level, obtaining the catalyst.

The preferred features in the following relate to the processes disclosed above.

Preferably the first monomer is resorcinol and the second monomer is formaldehyde.

Preferably the solvent comprises, more preferably consists, of water and acetic acid.

Preferably the catalyst used in a) and/or 1) is an ammonium acetate catalyst.

Furthermore, it is noted that the catalysts of the present invention might be prepared according to the process described in WO 2012/092210 A1 by varying the polymerization and gelation conditions (temperature, duration, etc.).

The present invention is further illustrated by the following set of embodiments and combinations of embodiments resulting from the dependencies and back-references as indicated. In particular, it is noted that in each instance where a range of embodiments is mentioned, for example in the context of a term such as "The reaction mixture of any one of embodiments 1 to 4", every embodiment in this range is meant to be explicitly disclosed for the skilled person, i.e. the wording of this term is to be understood by the skilled person as being synonymous to "The reaction mixture of any one of embodiments 1, 2, 3, and 4". Further, it is explicitly noted that the following set of embodiments represents a suitably structured part of the general de-scription directed to preferred aspects of the present invention, and, thus, suitably supports, but does not represent the claims of the present invention.

1. A reaction mixture for preparing phosgene, the mixture comprising (i) a catalyst for preparing phosgene comprising a porous material comprising carbon, micropores and mesopores, wherein said micropores have a pore diameter, preferably determined according to DIN 66135-2, of less than 2 nm and wherein said mesopores have a pore diameter, preferably determined ac cording to DIN 66134, in the range of from 2 to 50 nm, wherein the volume of the mesopores of the porous material, preferably deter-mined ac cording to dual-isotherm Nonlocal Density Functional Theoretical (NLDFT) Advanced Pore Size Distribution (PSD) technique, is of at least 0.45 ml/g; and (ii) a gas stream G comprising carbon monoxide (CO) and chlorine (Cl2).

2. The reaction mixture of embodiment 1, wherein the ratio of the volume of the mesopores of the porous material of the catalyst (i) relative to the volume of the micropores of the porous material of the catalyst (i) is of at least 1:1, preferably in the range of from 1.1:1 to 6:1, more preferably in the range of from 1.15:1 to 5:1, more preferably in the range of from 1.2:1 to 4:1, the volume of the mesopores of the porous material and the volume of the micropores of the porous material being preferably determined according to dual-isotherm NLDFT Advanced PSD technique.

3. The reaction mixture of embodiment 1 or 2, wherein the ratio of the volume of the mesopores of the porous material of the catalyst (i) relative to the total pore volume of the porous material of the catalyst (i), is of at least 0.5:1, preferably in the range of from 0.5:1 to 0.9:1, more preferably in the range of from 0.55:1 to 0.85:1, more preferably in the range of from 0.6:1 to 0.8:1, more preferably in the range of from 0.65:1 to 0.8:1, the volume of the mesopores of the porous material and the total pore volume of the porous material being preferably determined according to dual-isotherm NLDFT Advanced PSD technique.

4. The reaction mixture of any one of embodiments 1 to 3, wherein the volume of the mesopores of the porous material of the catalyst (i) is of at least 0.5 ml/g.

5. The reaction mixture of any one of embodiments 1 to 4, wherein the total pore volume of the porous material of the catalyst (i) is in the range of from 0.5 to 2.25 ml/g, preferably in the range of from 0.55 to 1.75 ml/g, more preferably in the range of from 0.65 to 1.70 ml/g, the total pore volume of the porous material being preferably determined according to dual-isotherm NLDFT Advanced PSD technique.

6. The reaction mixture of any one of embodiments 1 to 5, wherein less than or equal to 40%, preferably less than or equal to 30%, more preferably less than or equal to 25%, more preferably less than or equal to 20%, more preferably less than or equal to 15%, more preferably less than or equal to 10%, more preferably less than or equal to 5%, more preferably less than or equal to 2.5%, more preferably less than or equal to 1%, of the total pore volume of the porous material of the catalyst (i) resides in mesopores having a pore diameter of greater than 20 nm.

7. The reaction mixture of any one of embodiments 1 to 6, wherein the volume of the mesopores of the porous material of the catalyst (i) is in the range of from 0.50 to 0.54 ml/g, preferably in the range of from 0.51 to 0.53 m/g, and the ratio of the volume of the mesopores of the porous material of the catalyst (i) relative to the total pore volume of the porous material of the catalyst (i) is in the range of from 0.70:1 to 0.75:1, preferably in the range of from 0.72:1 to 0.74:1, the volume of the mesopores of the porous material and the total pore volume of the porous material being preferably determined according to dual-isotherm NLDFT Advanced PSD technique.

8. The reaction mixture of any one of embodiments 1 to 6, wherein the volume of the mesopores of the porous material of the catalyst (i) is in the range of from 0.64 to 0.70 ml/g, preferably in the range of from 0.65 to 0.67 ml/g, and the ratio of the volume of the mesopores of the porous material of the catalyst (i) relative to the total pore volume of the porous material of the catalyst (i), is in the range of from 0.72:1 to 0.78:1, preferably in the range of from 0.73:1 to 0.76:1, the volume of the mesopores of the porous material and the total pore volume of the porous material being preferably determined according to dual-isotherm NLDFT Advanced PSD technique.

9. The reaction mixture of any one of embodiments 1 to 8, wherein the volume of the micropores of the porous material of the catalyst (i), preferably determined according to dual-isotherm NLDFT Advanced PSD technique, is of at most 0.7 ml/g, preferably of at most 0.6 ml/g.

10. The reaction mixture of any one of embodiments 1 to 9, wherein the BET specific surface area of the porous material of the catalyst (i) is of at least 500 m2/g, preferably in the range of from 500 to 2500 m2/g, more preferably in the range of from 550 to 1800 m2/g, more preferably in the range of from 600 to 1500 m2/g.

11. The reaction mixture of any one of embodiments 1 to 10, wherein the total specific surface area of the porous material of the catalyst (i), measured according to dual-isotherm NLDFT Advanced PSD technique, is of at least 600 m$^2$/g, preferably in the range of from 650 to 2000 m$^2$/g, more preferably in the range of from 700 to 1800 m$^2$/g.

12. The reaction mixture of any one of embodiments 1 to 11, wherein the specific surface area of the porous material of the catalyst (i) induced by the mesopores, measured according to dual-isotherm NLDFT Advanced PSD technique, is of in the range of from 70 to 250 m$^2$/g, preferably in the range of from 80 to 170 m$^2$/g.

13. The reaction mixture of embodiment 12, wherein the ratio of specific surface area of the porous material of the catalyst (i) induced by the mesopores relative to the total specific surface area of the porous material of the catalyst (i) is in the range of from 0.07:1 to 0.40:1, preferably in the range of from 0.07:1 to 0.20:1.

14. The reaction mixture of any one of embodiments 1 to 13, wherein the porous material of the catalyst (i) is a pyrolyzed carbon aerogel, preferably an activated pyrolyzed carbon aerogel.

15. The reaction mixture of any one of embodiments 1 to 14, wherein from 99 to 100 weight %, preferably from 99.5 to 100 weight-%, more preferably from 99.9 to 100 weight-%, of the porous material of the catalyst (i) consists of the carbon.

16. The reaction mixture of any one of embodiments 1 to 15, wherein less than or equal to 0.5 weight-% of the porous material of the catalyst (i) consists of oxygen.

17. The reaction mixture of any one of embodiments 1 to 16, wherein less than or equal to 0.5 weight-%, preferably less than or equal to 0.1 weight-%, of the porous material of the catalyst (i) consists of hydrogen.

18. The reaction mixture of any one of embodiments 1 to 17, wherein less than or equal to 0.01 weight-%, of the porous material of the catalyst (i) consists of nitrogen.

19. The reaction mixture of any one of embodiments 1 to 18, wherein the ash content of the porous material of the catalyst (i) is of less than or equal to 0.1 weight-%, preferably less than or equal to 0.08 weight-%, more preferably less than or equal to 0.05 weight-%, more preferably less than or equal to 0.03 weight-%, more preferably less than or equal to 0.025 weight-%, more preferably less than or equal to 0.01 weight-%, more preferably less than or equal to 0.0075 weight-%, more preferably less than or equal to 0.005 weight %, more preferably less than or equal to 0.001 weight-%, based on the weight of said porous material, as calculated from total reflection x-ray fluorescence data.

20. The reaction mixture of any one of embodiments 1 to 19, wherein the porous material of the catalyst (i) has a total impurity content of elements having atomic numbers ranging from 11 to 92 as measured by total reflection x-ray fluorescence (TXRF) of less than 500 ppm, preferably less than 300 ppm, more preferably less than 200 ppm, more preferably less than 100 ppm.

21. The reaction mixture of any one of embodiments 1 to 20, wherein from 99 to 100 weight %, preferably from 99.5 to 100 weight-%, more preferably from 99.9 to 100 weight-%, of the catalyst (i) consists of the porous material.

22. The reaction mixture of embodiment 21, wherein the catalyst (i) is the porous material.

23. The reaction mixture of any one of embodiments 1 to 22, wherein the gas stream G consists of carbon monoxide and chlorine.

24. A catalyst for preparing phosgene comprising a porous material comprising carbon, micropores and mesopores, wherein said micropores have a pore diameter, preferably determined according to DIN 66135-2, of less than 2 nm and wherein said mesopores have a pore diameter, preferably determined according to DIN 66134, in the range of from 2 to 50 nm, wherein the volume of the mesopores of the porous material is in the range of from 0.50 to 0.54 ml/g and the ratio of the volume of the mesopores of the porous material relative to the total pore volume of the porous material is in the range of from 0.70:1 to 0.75:1, the volume of the mesopores of the porous material and the total pore volume of the porous material being preferably determined according to dual-isotherm NLDFT Advanced PSD technique, wherein from 99 to 100 weight-% of the porous material consist of carbon.

25. The catalyst of embodiment 24, wherein the volume of the mesopores of the porous material is in the range of from 0.51 to 0.53 ml/g, and the ratio of the volume of the mesopores of the porous material relative to the total pore volume of the porous material is in the range of from 0 0.72:1 to 0.74:1.

26. A catalyst for preparing phosgene comprising
 a porous material comprising carbon, micropores and mesopores, wherein said micropores have a pore diameter, preferably determined according to DIN 66135-2, of less than 2 nm and wherein said mesopores have a pore diameter, preferably determined according to DIN 66134, in the range of from 2 to 50 nm, wherein the volume of the mesopores of the porous material is in the range of from 0.64 to 0.70 ml/g, and the ratio of the volume of the mesopores of the porous material relative to the total pore volume of the porous material is in the range of from 0.72:1 to 0.78:1, the volume of the mesopores of the porous material and the total pore volume of the porous material being preferably determined according to dual-isotherm NLDFT Advanced PSD technique,
 wherein from 99 to 100 weight-% of the porous material consist of carbon.

27. The catalyst of embodiment 26, wherein the volume of the mesopores of the porous material is in the range of from 0.65 to 0.67 ml/g, and the ratio of the volume of the mesopores of the porous material relative to the total pore volume of the porous material, is in the range of from 0.73:1 to 0.76:1.

28. The catalyst of any one of embodiments 24 to 27, wherein the ratio of the volume of the mesopores of the porous material relative to the volume of the micropores of the porous material is of at least 1:1, preferably in the range of from 1.1:1 to 6:1, more preferably in the range of from 1.15:1 to 5:1, more preferably in the range of from 1.2:1 to 4:1, the volume of the mesopores of the porous material and the volume of the micropores of the porous material being preferably determined according to dual-isotherm NLDFT Advanced PSD technique.

29. The catalyst of any one of embodiments 24 to 28, wherein less than or equal to 40%, preferably less than or equal to 30%, more preferably less than or equal to 25%, more preferably less than or equal to 20%, more preferably less than or equal to 15%, more preferably less than or equal to 10%, more preferably less than or equal to 5%, more preferably less than or equal to 2.5%, more preferably less than or equal to 1%, of the total pore volume of the porous material resides in mesopores having a pore diameter of greater than 20 nm.

30. The catalyst of any one of embodiments 24 to 29, wherein the volume of the micropores of the porous material, preferably determined according to dual-isotherm NLDFT Advanced PSD technique, is of at most 0.7 ml/g, preferably of at most 0.6 ml/g.

31. The catalyst of any one of embodiments 24 to 30, wherein the BET specific surface area of the porous material is of at least 500 m2/g, preferably in the range of from 500 to 2500 m2/g, more preferably in the range of from 550 to 1800 m2/g, more preferably in the range of from 600 to 1500 m2/g.

32. The catalyst of any one of embodiments 24 to 31, wherein the total specific surface area of the porous material, measured according to dual-isotherm NLDFT Advanced PSD technique, is of at least 600 $m^2/g$, preferably in the range of from 650 to 2000 $m^2/g$, more preferably in the range of from 700 to 1800 $m^2/g$.

33. The catalyst of any one of embodiments 24 to 32, wherein the specific surface area of the porous material induced by the mesopores, measured according to dual-isotherm NLDFT Advanced PSD technique, is of in the range of from 70 to 250 $m^2/g$, preferably in the range of from 80 to 170 $m^2/g$.

34. The catalyst of embodiment 33, wherein the ratio of specific surface area of the porous material induced by the mesopores relative to the total specific surface area of the porous material is in the range of from 0.07:1 to 0.40:1, preferably in the range of from 0.07:1 to 0.20:1.

35. The catalyst of any one of embodiments 24 to 34, wherein the porous material is a pyrolyzed carbon aerogel, preferably an activated pyrolyzed carbon aerogel.

36. The catalyst of any one of embodiments 24 to 35, wherein from 99.5 to 100 weight-%, preferably from 99.9 to 100 weight-%, of the porous material consists of the carbon.

37. The catalyst of any one of embodiments 24 to 36, wherein less than or equal to 0.5 weight-% of the porous material consists of oxygen.

38. The catalyst of any one of embodiments 24 to 37, wherein less than or equal to 0.5 weight-%, preferably less than or equal to 0.1 weight-%, of the porous material consists of hydrogen.

39. The catalyst of any one of embodiments 24 to 38, wherein less than or equal to 0.01 weight-%, of the porous material consists of nitrogen.

40. The catalyst of any one of embodiments 24 to 39, wherein the ash content of the porous material is of less than or equal to 0.1 weight-%, preferably less than or equal to 0.08 weight-%, more preferably less than or equal to 0.05 weight-%, more preferably less than or equal to 0.03 weight-%, more preferably less than or equal to 0.025 weight-%, more preferably less than or equal to 0.01 weight-%, more preferably less than or equal to 0.0075 weight-%, more preferably less than or equal to 0.005 weight-%, more preferably less than or equal to 0.001 weight-%, based on the weight of said porous material, as calculated from total reflection x-ray fluorescence data.

41. The catalyst of any one of embodiments 24 to 40, wherein the porous material has a total impurity content of elements having atomic numbers ranging from 11 to 92 as measured by total reflection x-ray fluorescence (TXRF) of less than or equal to 500 ppm, preferably less than or equal to 300 ppm, more preferably less than or equal to 200 ppm, more preferably less than or equal to 100 ppm.

42. The catalyst of any one of embodiments 24 to 41, wherein from 99 to 100 weight-%, preferably from 99.5 to 100 weight-%, more preferably from 99.9 to 100 weight-%, of the catalyst consists of the porous material.

43. The catalyst of embodiment 42, being the porous material.

44. Use of the catalyst according to any one of embodiments 24 to 43, or of the reaction mixture according to any one of embodiments 1 to 23, for preparing phosgene.

45. A process for preparing a catalyst (i) of the reaction mixture for preparing phosgene according to any one of embodiments 1 to 23 or a catalyst according to any one of embodiments 24 to 43, the process comprising
    a) preparing a mixture comprising a solvent, a catalyst, a first monomer and a second monomer;
    b) co-polymerizing the first and second monomer of the mixture obtained according to a), obtaining a resin mixture;
    c) heating the resin mixture obtained according to b) at a curing temperature, obtaining a polymer composition comprising the solvent and a polymer formed from co-polymerizing the first and second monomer, wherein the solvent concentration in the polymer composition is at least 40 weight-%, based on the total weight of the polymer composition; and
    d) pyrolyzing the polymer composition obtained according to c) at a pyrolysis temperature thereby substantially removing the solvent and pyrolyzing the polymer, obtaining the catalyst.

46. A process for preparing a catalyst (i) of the reaction mixture for preparing phosgene according to any one of embodiments 1 to 23 or a catalyst according to any one of embodiments 24 to 43, the process comprising
    1) preparing a mixture comprising a solvent, a catalyst, a first monomer and a second monomer, and maintaining the reaction mixture at a reaction temperature for a reaction time;
    2) co-polymerizing the first and second monomer of the mixture according to 1), obtaining a resin mixture;
    3) curing the resin mixture obtained according to 2) at a curing temperature, obtaining a polymer composition comprising the solvent and a polymer formed from co-polymerizing the first and second monomer according to 2);
    4) pyrolyzing the polymer composition obtained according to 3) at a pyrolysis temperature, thereby substantially removing the solvent and pyrolyzing the polymer, obtaining a carbon material; and
    5) optionally activating the carbon material at an activation temperature, thereby in-creasing the surface area and pore volume to a desired level, obtaining the catalyst.

47. The process of embodiment 45 or 46, wherein the first monomer is resorcinol and the second monomer is formaldehyde.

48. The process of any one of embodiments 45 to 47, wherein the solvent comprises, preferably consists, of water and acetic acid.

49. The process of any one of embodiments 45 to 48, wherein the catalyst is an ammonium acetate catalyst.

In the context of the present invention, the total pore volume of the porous material is the sum of the volume of the mesopores of the porous material and the volume of the micropores of the porous material.

In the context of the present invention, the total specific surface area of the porous material is preferably determined by dual-isotherm NLDFT Advanced Pore Size Distribution (Micro-meretics ASAP 2020_Micromeritics Instrument Corp., Norcross, GA, USA). NLDFT Surface area is expressed in $m^2/g$. The NLDFT Advanced Pore Size Distribution technique employs up to two inert gases, namely nitrogen and carbon dioxide, to measure the amount of gas ad-sorbed on a material and can be used to determine the accessible surface area of a given material.

Further, in the context of the present invention, the total pore volume of the porous material is preferably determined by dual-isotherm NLDFT Advanced Pore Size Distribution (Micro-meretics ASAP 2020_Micromeretics Instrument Corp., Norcross, GA, USA). Said total pore volume is expressed in ml/g. The NLDFT Advanced Pore Size Distribution technique employs up to two inert gases, namely nitrogen and carbon dioxide, to measure the amount of gas ad-sorbed on a given material and can be used to determine the total pore volume of said given material. Similarly, the pore volume within certain pore size ranges (mesopores, micropores) is determined by the same method. Hence, the volume of the mesopores of the porous material and the volume of the micropores of the porous material are determined by dual-isotherm NLDFT Advanced Pore Size Distribution (Micromeretics ASAP 2020).

In the context of the present invention, "TXRF impurity" or "TXRF element" may be any impurity element having an atomic number ranging from 11 to 92 (i.e., from beryllium to uranium). The terms "total TXRF impurity content" and "total TXRF impurity level" both refer to the sum of all TXFR impurities present in a sample, for example, the porous material. TXRF impurity concentrations and identities may be determined by total reflection x-ray fluorescence (TXRF).

The oxygen, hydrogen and nitrogen content of the porous material can be determined by combustion analysis. Techniques for determining elemental composition by combustion analysis are well known in the art.

Further, in the context of the present invention, "pore" refers to an opening or depression in the surface, or a tunnel in a given porous material, such as for example a pyrolyzed carbon material. A pore can be a single tunnel or connected to other tunnels in a continuous network throughout the structure of the porous material.

In the context of the present invention, the term "BET specific surface area" refers to the total specific surface area of a material, such as the porous material, measurable by the BET technique. The BET specific surface area is expressed in $m^2/g$. For example, the BET specific surface area can be determined by BET (Brunauer/Emmett/Teller) method by physical adsorption of nitrogen at $-196°$ C. (liquid nitrogen) using a Micrometrics ASAP 2420 apparatus.

The present invention is further illustrated by Examples 1 and 2.

EXAMPLES

Reference Example Process for Preparing Catalysts for Preparing Phosgene According to the Present Invention The catalysts (porous carbon materials) 4 to 7 according to the present invention were prepared by a process defined in WO 2012/092210 A1: one approach for producing such high surface area activated carbon materials is to prepare a synthetic polymer from carbon-containing organic building blocks (e.g., a polymer gel). For example, varying the polymerizing and gelation conditions (temperature, duration, etc.) permits to obtain different catalysts. As with the existing organic materials, the synthetically prepared polymers are dried (e.g., by evaporation or freeze drying) pyrolyzed and activated to produce an activated carbon material (e.g., an aerogel or xerogel). Thus, the method for preparing the catalysts 4 to 7, a porous material (pyrolyzed carbon aerogel) comprising carbon, micropores and mesopores, comprises:

preparing a mixture comprising a solvent (water/acetic acid), a catalyst (ammonium acetate catalyst), a first monomer (resorcinol) and a second monomer (formaldehyde);

co-polymerize the first and second monomer of the mixture, obtaining a resin mixture; curing the obtained resin mixture at a curing temperature (e.g. 95° C.), obtaining a polymer composition comprising the solvent and a polymer formed from co-polymerizing the first and second monomer, wherein the solvent concentration in the polymer composition is at least 40 weight-%, based on the total weight of the polymer composition; and pyrolyzing the obtained polymer composition at a pyrolysis temperature thereby substantially removing the solvent and pyrolyzing the polymer to yield a carbon material. Alternatively, the process comprises preparing a mixture comprising a solvent (water/acetic acid), a catalyst (ammonium acetate catalyst), a first monomer (resorcinol) and a second monomer (formaldehyde), and maintaining the reaction mixture at a reaction temperature for a reaction time;

co-polymerize the first and second monomer of the obtained mixture, obtaining a resin mixture; curing the obtained resin mixture at a curing temperature (e.g. 95° C.), obtaining a polymer composition comprising the solvent and a polymer formed from co-polymerizing the first and second monomer;

pyrolyzing the obtained polymer composition at a pyrolysis temperature, thereby substantially removing the solvent and pyrolyzing the polymer, obtaining a carbon material; and optionally activating the carbon material at an activation temperature, thereby increasing the surface area and pore volume to a desired level to yield porous carbon materials 4 to 7. The curing is done at elevated temperature, for example around 95° C.

Example Process for Preparing Phosgene Using Catalysts According to the Present Invention (Samples 4-8) and Catalyst of the Prior Art (Samples 1 and 3)

General Procedure:

Extrudates or granules of the tested fresh catalysts were milled and sieved to get granulates in the range of 1.5 to 2 mm. A mass of 0.2 g of the granulates were filled in a reaction tube of 5.4 mm inner diameter placed inside a heating jacket. A mixture of 15.9 Nl/h CO and 14.6 Nl/h $Cl_2$ was fed to the reaction tube held at 400° C. These conditions were maintained for 15 hours to realize a conditioning of the catalyst (e.g. chlorination). After that the temperature was decreased to 250° C. and the above-mentioned $CO/Cl_2$ mixture was decreased to $\frac{1}{10}$ and $N_2$ was added to get the original molar flow towards the reaction tube. The phosgene (CDC) concentration at the outlet was measured by IR spectroscopy.

The pore size distribution in the range below 100 nm of the catalysts was measured by dual-isotherm NLDFT Advanced PSD for the fresh catalyst.

The results are summarized in Table 1 below. The specific surface area (SSA) listed in Table 1 are expressed in $m^2/g$. Further, it is noted the tested catalyst 7 (sample 7) was activated after pyrolysis.

TABLE 1

| No. | Description | Type | BET surface area ($m^2/g$) | Total pore volume (ml/g) | Total micropore volume (ml/g) | Total mesopore volume (ml/g) | Micropore volume: Total Pore Volume | Mesopore volume: Total Pore Volume | Total NLDFT SSA | NLDFT SSA <20Å | NLDFT SSA >20Å | CDC at outlet (w/w) |
|---|---|---|---|---|---|---|---|---|---|---|---|---|
| 1 | Donaucarbon Desorex type | Non-inventive | 1016 | 0.43 | 0.37 | 0.06 | 0.86 | 0.14 | 942 | 912 | 30 | 0.0283 |
| 3 | Pyrolised carbon aerogel 1 | Non-inventive | 515 | 0.34 | 0.18 | 0.16 | 0.53 | 0.47 | 713 | 669 | 44 | 0.0145 |

TABLE 1-continued

| No. | Description | Type | BET surface area (m²/g) | Total pore volume (ml/g) | Total micropore volume (ml/g) | Total mesopore volume (ml/g) | Micropore volume: Total Pore Volume | Mesopore volume: Total Pore Volume | Total NLDFT SSA | NLDFT SSA <20Å | NLDFT SSA >20Å | CDC at outlet (w/w) |
|---|---|---|---|---|---|---|---|---|---|---|---|---|
| 4 | Pyrolised carbon aerogel 2 | Inventive | 681 | 0.79 | 0.21 | 0.58 | 0.27 | 0.73 | 905 | 789 | 116 | 0.065 |
| 5 | Pyrolised carbon aerogel 3 | Inventive | 727 | 0.89 | 0.22 | 0.66 | 0.25 | 0.74 | 790 | 669 | 121 | 0.0845 |
| 6 | Pyrolised carbon aerogel 4 | Inventive | 1174 | 1.68 | 0.38 | 1.3 | 0.23 | 0.77 | 1497 | 1344 | 153 | 0.1444 |
| 7 | Pyrolised carbon aerogel 5 | Inventive | 607 | 0.72 | 0.19 | 0.52 | 0.26 | 0.72 | 861 | 773 | 88 | 0.0861 |
| 8 | Pyrolised carbon aerogel 6 | Inventive | 1673 | 1.31 | 0.58 | 0.72 | 0.44 | 0.55 | 1724 | 1603 | 121 | 0.14376 |

The invention claimed is:

1. A process for the production of phosgene comprising a gas phase reaction of carbon monoxide and chlorine in the presence of a carbon catalyst in a multi-tubular reactor, wherein the carbon catalyst comprises an amount of mesopores having a pore diameter in the range of from 2 to 50 nm of at least 0.45 ml/g of the total pore volume, wherein the volume fraction, of the mesopores having a pore diameter from 2 to 50 nm, is in the range of from 50% to 90% of the total pore volume.

2. The process according to claim 1, wherein the total pore volume of the carbon catalyst is at least 0.5 ml/g measured by nitrogen adsorption.

3. The process according to claim 1, wherein the total pore volume of the carbon catalyst is in the range of from 0.5 ml/g to 2 ml/g measured by nitrogen adsorption.

4. The process according to claim 1, wherein the BET surface of the carbon catalyst is at least 500 m²/g.

5. The process according to claim 1, wherein the BET surface of the carbon catalyst is in the range of from 500 m²/g to 2500 m²/g.

6. The process according to claim 1, wherein the carbon catalyst is a pyrolyzed carbon aerogel.

7. The process according to claim 6, wherein the carbon catalyst is an activated pyrolyzed carbon aerogel.

8. The process according to claim 1, wherein the carbon catalyst has a total impurity content of elements having atomic numbers ranging from 11 to 92 as measured by total reflection x-ray fluorescence (TXRF) of less than 500 ppm.

9. The process according to claim 1, wherein the reaction takes place in a tube-bundle reactor with catalyst filled inside the tubes.

10. The process according to claim 1, wherein a cooling media on a shell side is liquid or a boiling liquid.

11. The process according to claim 1, wherein a feed stream has a stoichiometric excess of carbon monoxide to chlorine of 0.0001 to 50 mol %.

12. The process according to claim 1, wherein the reaction takes place at a pressure of 1 to 10 bara.

13. The process according to claim 11, wherein the feed stream is supplied with an absolute pressure in the range of 0.5 to 20 bar.

14. The process according to claim 1, wherein the reaction is carried out at a surface load of 0.5 to 6 kg phosgene/m²s.

15. The process according to claim 1, wherein the contact tubes are passed by at least one fluid heat carrier in separate cooling zones.

16. The process according to claim 15, wherein as a fluid heat carrier a liquid heat carrier is used.

17. The process according to claim 15, wherein the least one fluid heat carrier is used to produce directly or indirectly steam.

* * * * *